(12) United States Patent
Chiaki

(10) Patent No.: US 7,932,937 B2
(45) Date of Patent: Apr. 26, 2011

(54) SIGNAL PROCESSING METHOD AND SIGNAL PROCESSING CIRCUIT

(75) Inventor: Hisako Chiaki, Nara (JP)

(73) Assignee: Panasonic Corporation, Osaka (JP)

( * ) Notice: Subject to any disclaimer, the term of this patent is extended or adjusted under 35 U.S.C. 154(b) by 439 days.

(21) Appl. No.: 12/282,570

(22) PCT Filed: Mar. 23, 2007

(86) PCT No.: PCT/JP2007/056017
§ 371 (c)(1),
(2), (4) Date: Sep. 11, 2008

(87) PCT Pub. No.: WO2007/111250
PCT Pub. Date: Oct. 4, 2007

(65) Prior Publication Data
US 2009/0059042 A1    Mar. 5, 2009

(30) Foreign Application Priority Data
Mar. 24, 2006   (JP) ................. 2006-082272

(51) Int. Cl.
*H04N 5/217* (2006.01)

(52) U.S. Cl. ........................................ 348/241

(58) Field of Classification Search .................. 348/241
See application file for complete search history.

(56) References Cited

U.S. PATENT DOCUMENTS

| 4,249,203 A | * | 2/1981 | Yamanaka | 348/264 |
| 4,677,497 A | * | 6/1987 | Yoshinaka | 386/307 |
| 5,337,152 A | * | 8/1994 | Kotaki | 348/234 |
| 5,471,323 A | * | 11/1995 | Suetsugi et al. | 358/511 |

FOREIGN PATENT DOCUMENTS

| JP | 06-054333 | 2/1994 |
| JP | 08-223590 | 8/1996 |
| JP | 09-252472 | 9/1997 |
| JP | 2004-032514 | 1/2004 |

* cited by examiner

*Primary Examiner* — James M Hannett
(74) *Attorney, Agent, or Firm* — McDermott Will & Emery LLP

(57) ABSTRACT

A common high frequency component common to signals adjusted based on a local similarity of signal amplitudes thereof before sampling so that folding components therein are cancelled is generated, and the generated common high frequency component is adjusted to a ratio corresponding to the balance of the original signal. The adjusted high frequency component is added to a low frequency component of each signal.

20 Claims, 12 Drawing Sheets subject 401   black color   white color

SIGNAL PROCESSING METHOD AND SIGNAL PROCESSING CIRCUIT

RELATED APPLICATIONS

This application is the U.S. National Phase under 35 U.S.C. §371 of International Application No. PCT/JP2007/056017, filed on Mar. 23, 2007, which in turn claims the benefit of Japanese Application No. 2006-082272, filed on Mar. 24, 2006, the disclosures of which Applications are incorporated by reference herein.

FIELD OF THE INVENTION

The present invention relates to a signal processing method and a signal processing circuit for obtaining a signal with a high resolution while controlling problems generated in signal processing by means of the spatial pixel shifting method, an example of which is the moire effect generated when a subject having a high chroma is shot in a solid imaging device.

BACKGROUND OF THE INVENTION

A solid imaging device of the three-plate type, in which the spatial pixel shifting method is used, conventionally comprises solid imaging elements (CCD or the like) for respective signals of G (green), B (blue) and R (red), wherein the CCDs are placed in such a manner that the CCDs for R and B, for example, are shifted relative to the CCD for G by one-half of a pixel in a horizontal direction.

According to the placement, it can be interpreted that the subject is imaged by a doubled sampling frequency in the spatial pixel shifting method in comparison to the case where the method is not adopted. Observing the signals obtained from the CCDs for the respective colors, any high frequency component having a frequency which is half the sampling frequency, in other words, a frequency equal to or more than the Nyquist frequency is included as a counterfeit signal called the folding component according to the sampling theorem. Such a placement makes the phases of the R and B signals shifted by 180 degrees relative to the G signal, and makes the phase of the included folding component shifted by 180 degrees in a similar manner.

In the respective signals, the high frequency component including the folding component of each color is replaced with a high frequency component common to each color in which the folding component is reduced as a high frequency component replacement processing in the spatial pixel shifting method. More specifically, a common signal for the respective colors, which is similar to a brightness signal, is generated from the respective color signals, and a high frequency component of the common signal is used as the high frequency component common to the respective colors. The common signal is generated, for example, when the R signal is used to represent the signals of the phases of R and B, and the R signal and the G signal are assigned to the formula of ((G+R)/2). As a result, the folding component included in the G signal and the folding components included in the R and B signals are added with the reverse phases, and the respective folding components are thereby cancelled. The high frequency component of the common signal thus obtained is used for the high frequency component replacing processing in which the high frequency component of the common signal is added to a low frequency component of each color. As a result, the signals each having the high frequency component in which the folding component is reduced can be obtained.

However, in the case where a subject having a high chroma, for example, a subject close to a green color which includes the high frequency component having a frequency equal to or more than the Nyquist frequency, is shot, the signals obtained by the CCDs for R and B are very small in comparison to the signal obtained by the CCD for G. Therefore, it is not possible to cancel the folding component of the high frequency component generated due to the failure of a sampling process in the CCD for G using the signals from the CCD for R and B. As a result, the common high frequency component still includes the folding component, resulting in inconvenience of creating the moire effect.

In order to solve the inconvenience, the signal processing circuit recited in the Patent Document 1 controls the generation of the moire effect by reducing a ratio of the common high frequency component to be added to the low frequency component of each color as the chroma is higher in accordance with the levels of the signals from the CCDs for G and R for generating the common high frequency component.

Patent Document 1: 2004-32514 of the Japanese Patent Applications Laid-Open

DISCLOSURE OF THE INVENTION

Problem to be Solved by the Invention

According to the conventional method for controlling the moire effect, however, the high frequency component included in the signal is reduced as the chroma of the subject is higher. In other words, the higher the chroma of a subject is, the more a resolution in the high frequency component is inevitably sacrificed.

Further, a part near to the part including the high frequency component is closer to an achromatic color because the common high frequency component is added to the low frequency component of each color.

Means for Solving the Problem

In order to solve the problem, the present invention is mostly characterized in that a common high frequency component common to respective signals adjusted so that folding components are cancelled is generated based on a local similarity in amplitude shapes of the respective signal before a sampling process, a ratio of the generated common high frequency component is adjusted to comply with the balance of the original signals, and the adjusted high frequency component is added to a low frequency component of each signal.

Effect of the Invention

According to the present invention, the moire effect can be controlled, the high frequency component's turning to the achromatic color can be controlled, and the signal with a high resolution can be provided even in the case of the subject having a high chroma. Further, in the case of subject having a low chroma, the signal with a high resolution can be provided without any problem in such a manner that the effect of the high frequency component replacing processing in which the conventional spatial pixel shifting method is used is maintained.

Further, the present invention relates to such a simple signal processing method that makes it unnecessary to select appropriate processing in a complicated manner depending on image characteristics and the like. Therefore, the signal

Figure 1:
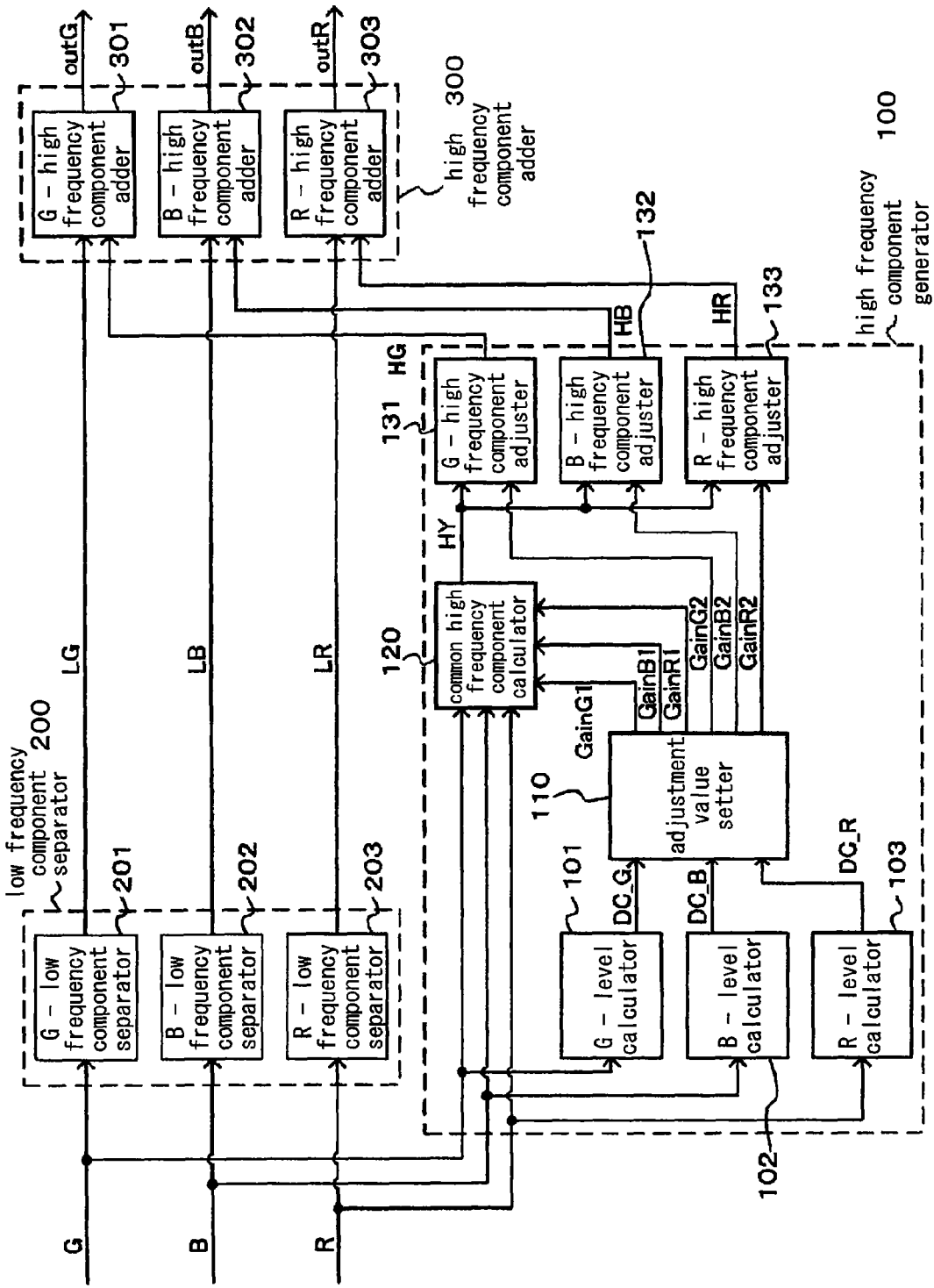
FIG. 1 is a block diagram illustrating a signal processing circuit according to a preferred embodiment of the present invention.

DESCRIPTION OF REFERENCE SYMBOLS 100 high frequency component generator
101 G-level calculator
102 B-level calculator
103 R-level calculator
110 adjustment value setter
115 element setter
116 common signal adjustment value calculator
117 adjustment value per color calculator
120 common high frequency component calculator
125 common signal calculator
126 common high frequency component separator
131 G-high frequency component adjuster
132 B-high frequency component adjuster
133 R-high frequency component adjuster
200 low frequency component separator
201 G-low frequency component separator
202 B-low frequency component separator
203 R-low frequency component separator
300 high frequency component adder
301 G-high frequency component adder
302 B-high frequency component adder
303 R-high frequency component adder
401, 501 subject

PREFERRED EMBODIMENT OF THE PRESENT INVENTION

Hereinafter, a preferred embodiment of the present invention is described referring to the drawings.

Preferred Embodiment

Figure 2:
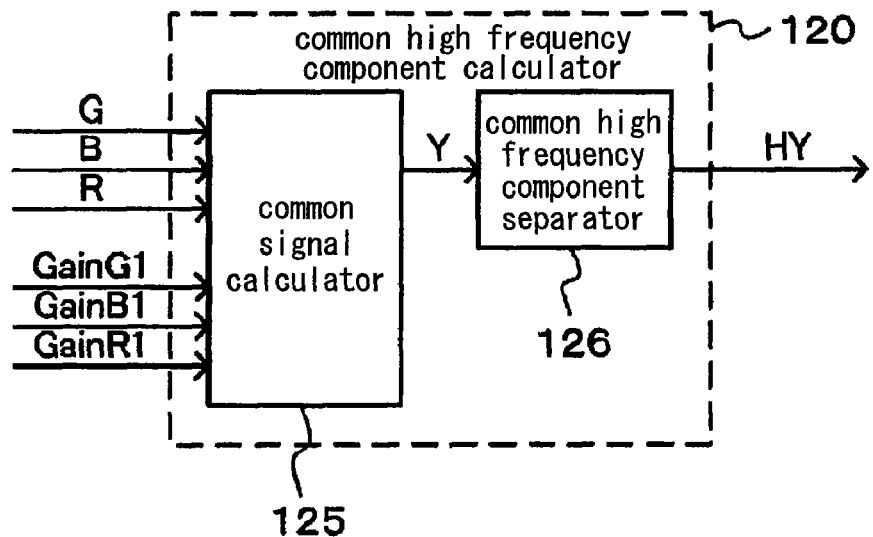
FIG. 2 shows a constitution of a common high frequency component calculator in the signal processing circuit according to the preferred embodiment.
Figure 3:
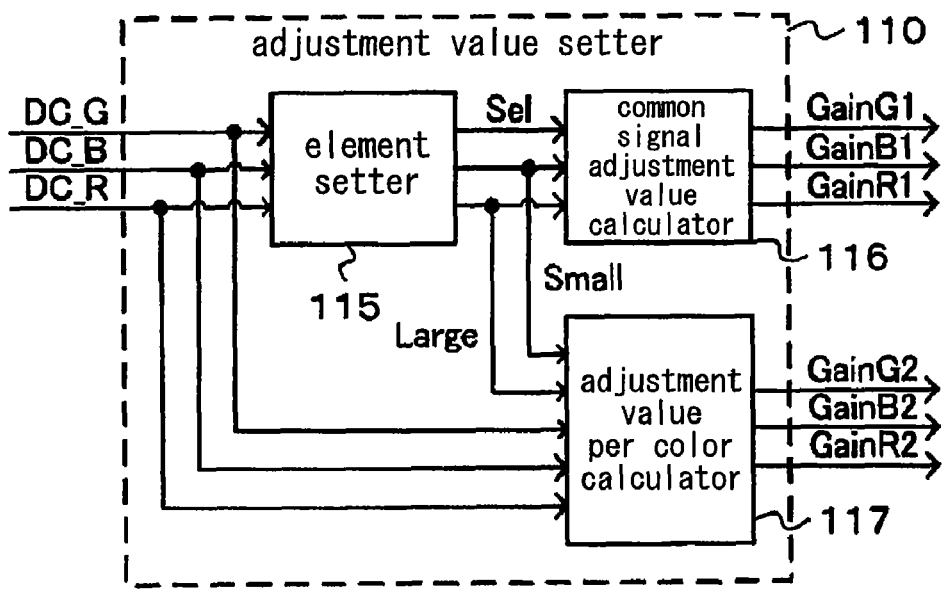
FIG. 3 shows a constitution of an adjustment value setter in the signal processing circuit according to the preferred embodiment.
Figure 4:
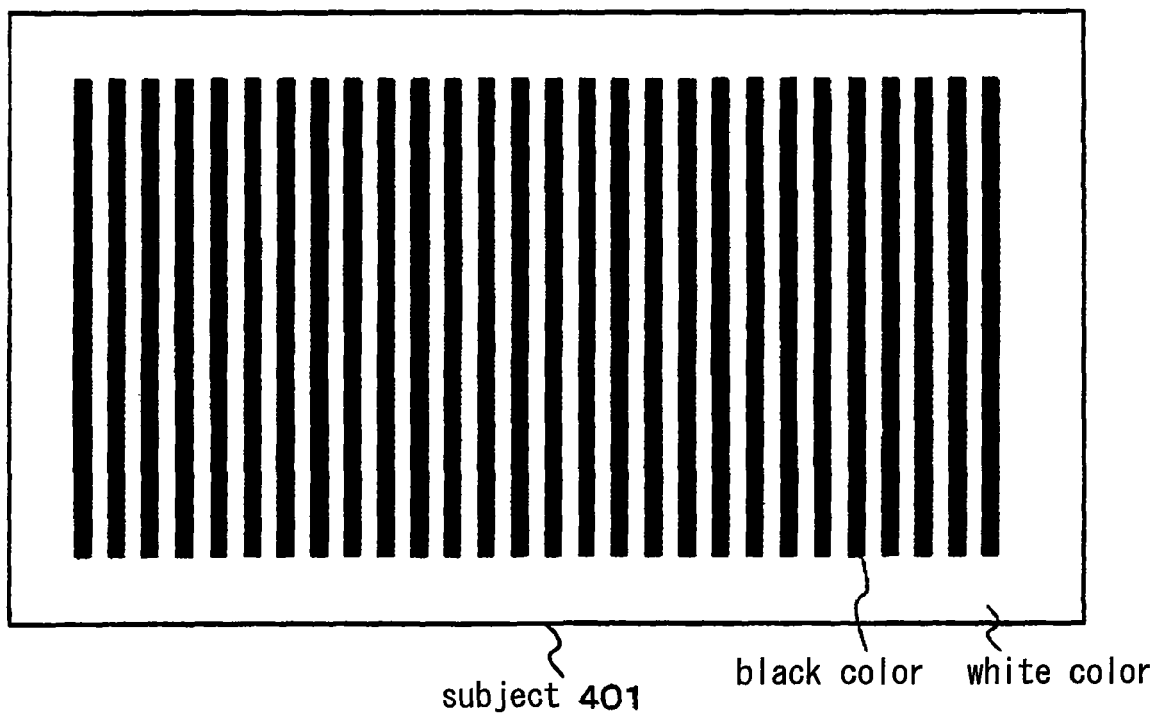
FIG. 4 shows an example of a subject.
Figure 5:
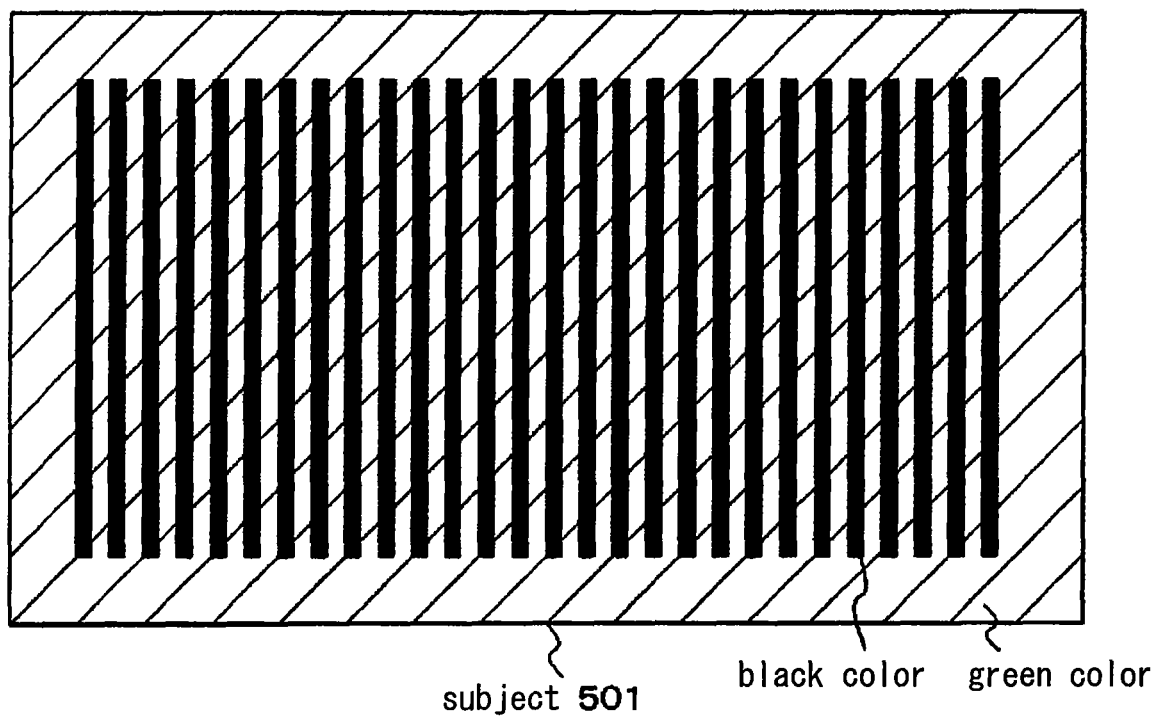
FIG. 5 shows an example of the subject.

In a preferred embodiment of the present invention, the present invention is implemented in a signal processing circuit for processing a video signal. FIG. 1 is a block diagram illustrating a signal processing circuit according to a preferred embodiment of the present invention. FIG. 2 shows a constitution of a common high frequency component calculator which is a part of the signal processing circuit according to the preferred embodiment. FIG. 3 shows a constitution of an adjustment value setter which is a part of the signal processing circuit according to the preferred embodiment. FIGS. 4 and 5 show examples of a subject. FIGS. 6-13 show signal waveforms and sampling positions of each color.

Signals obtained in such a manner that, of CCDs for colors G (green), B (blue) and R (red) for obtaining video information, the CCDs for R and B are shifted by one-half of a pixel in a horizontal direction relative to the CCD for G by means of the spatial pixel shifting method are referred to as respective color signals G, B and R.

The signal processing device according to the present preferred embodiment comprises a low frequency component separator 200, a high frequency component generator 100 and a high frequency component adder 300. The low frequency component separator 200 separates low frequency components LG, LB and LR from the respective color signals. The high frequency component generator 100 generates high frequency components HG, HB and HR from which folding components of the respective signals are removed. The high frequency component adder 300 adds the generated high frequency components of the respective colors to the low frequency components to thereby generate respective color signals outG, outB and outR in which the high frequency components are replaced. In the case of an image signal, a component having a frequency equal to or more than a threshold value is called the high frequency component, while a component having a frequency below the threshold value is called the low frequency component. An example of the threshold value is a frequency slightly lower than the Nyquist frequency. However, the threshold value is limitedly used for the image signal. In any other signal such as an audio signal, a threshold value specific thereto is set.

The high frequency component generator 100 comprises level calculators 101, 102 and 103 for the respective colors, an adjustment value setter 110, a common high frequency component calculator 120, and high frequency component adjusters 131, 132 and 133 for the respective colors. The level calculators 101, 102 and 103 for the respective colors calculate DC values of small regions in the respective colors. A spatial position from which the high frequency components of the signals R, G and B are extracted is referred to as a targeted position, and a spatial region including the targeted position and the neighborhood thereof is referred to as the small region. The DC values of the small regions of the respective colors are referred to as DC_G, DC_B and DC_R.

The adjustment value setter 110 sets first adjustment values Gain G1, B1 and R1 and second adjustment values GainG2, B2 and R2 for adjusting the signals of the respective colors. Hereinafter, the first adjustment values are collectively called GainX1, while the second adjustment values are collectively called GainX2. The common high frequency component calculator 120 calculates a common high frequency component HY which is common to the respective colors. The high frequency component adjusters 131, 132 and 133 generate the high frequency components HG, HB and HR for the respective colors from the high frequency component HY.

The common high frequency component calculator 120 comprises a common signal calculator 125 and a common high frequency component separator 126 as shown in FIG. 2. The common signal calculator 125 calculates a common signal Y, which is used as a reference value for the respective colors, from the respective color signals G, B and R of the respective colors and the first adjustment value GainX1. The common high frequency component separator 126 separates the common high frequency component HY from the common signal Y.

The adjustment value setter 110 comprises an element setter 115, a common signal adjustment value calculator 116 and an adjustment value per color calculator 117 as shown in FIG. 3. The element setter 115 sets signals used when the first and second adjustment values GainX1 and GainX2 are calculated from the DC values DC_G, DC_B and DC_R of the respective colors. The common signal adjustment value calculator 116 calculates the first adjustment value GainX1. The adjustment value per color calculator 117 calculates the second adjustment value GainX2. The second adjustment value GainX2 is an adjustment value showing a ratio of an addition of the common high frequency component HY when it is added to each color.

Below is described the operation of the signal processing circuit according to the present preferred embodiment thus constituted. The description given below is based on the assumption of a signal obtained when a subject 501, which is shown in FIG. 5, having a high chroma and a stripe pattern of black and green colors including the high frequency component having a frequency equal to or more than the Nyquist frequency is shot. The Nyquist frequency recited in this description denotes the Nyquist frequency in the case where the CCDs are not shifted.

Figure 9:
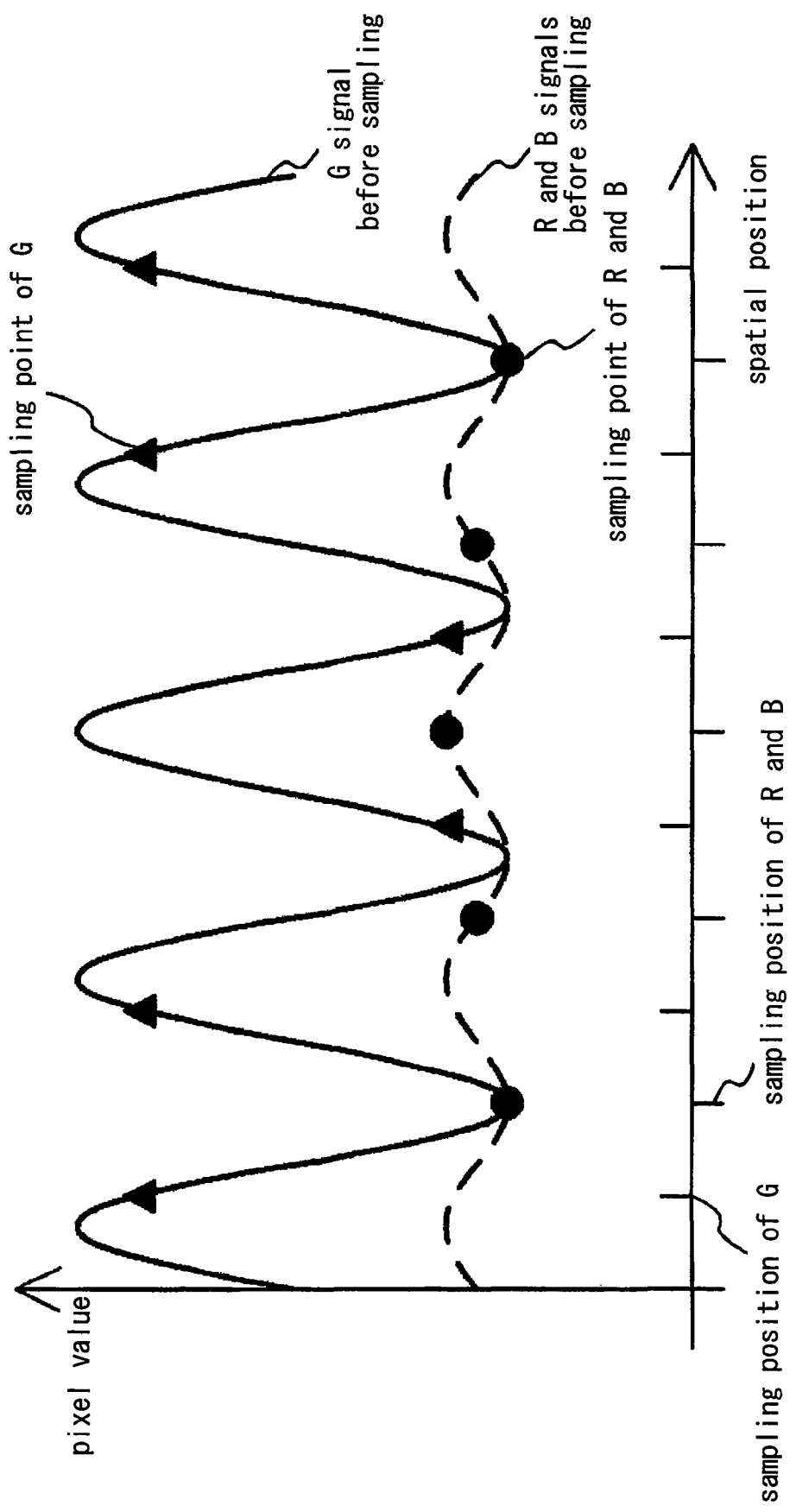
FIG. 9 shows signal waveforms and sampling positions in the signal processing circuit according to the preferred embodiment.
Figure 10:
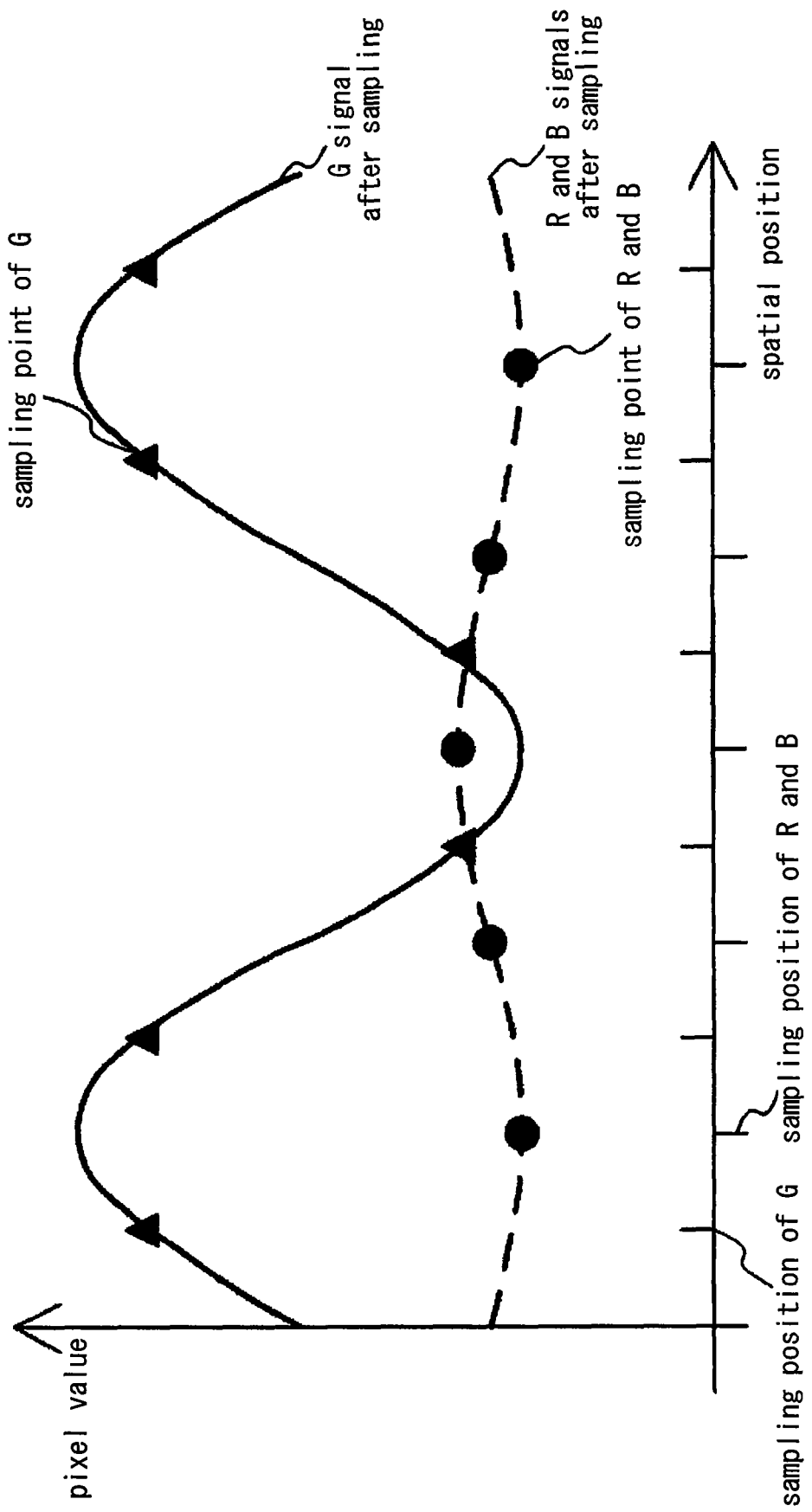
FIG. 10 shows signal waveforms and sampling positions in the signal processing circuit according to the preferred embodiment.

As shown in FIG. 9, in the signals G, B and R before sampling, sampling points of the signal G are respectively marked with a black triangle, and sampling points of the signals R and B are respectively marked with a black circle. In the solid imaging device of the three-plate type in which the spatial pixel shifting method is used, the respective signals G, B and R are sampled after the phases thereof are shifted with each other by 180 degrees. Therefore, the post-sampling signal G and signals R and B each include counterfeit signals of the folding component as shown in FIG. 10.

Figure 11:
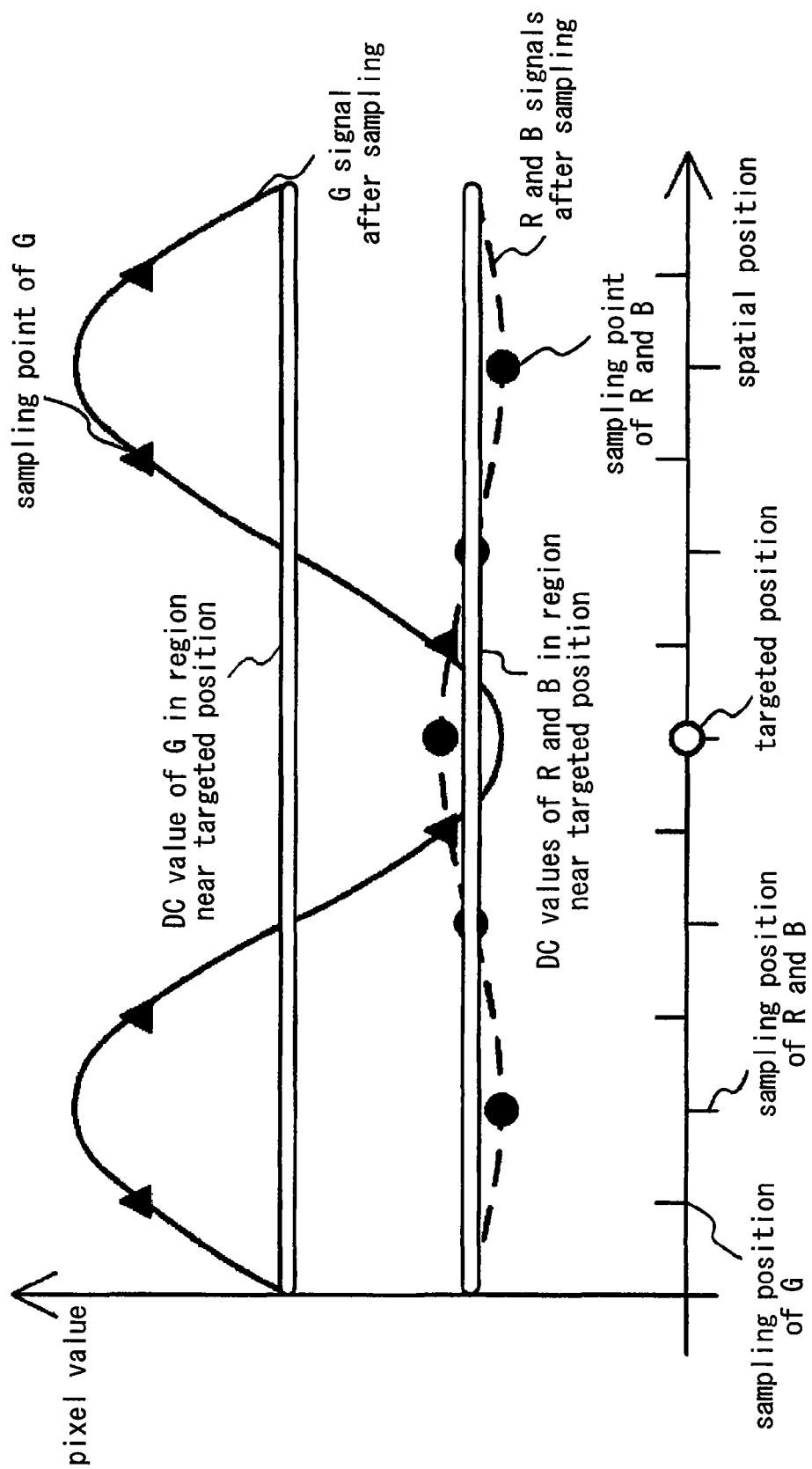
FIG. 11 shows signal waveforms and sampling positions in the signal processing circuit according to the preferred embodiment.

The signals G, B and R are supplied to the level calculators 101, 102 and 103 for the respective colors and the low frequency component separators 201, 202 and 203 for respective colors of the low frequency component separator 200. The low frequency component separators 201, 202 and 203 for the respective colors extract the low frequency components LG, LB and LR from the supplied signals G, B and R and supply the extracted components to the high frequency component adders 301, 302 and 303 for the respective colors of the high frequency component adder 300. The level calculators 101, 102 and 103 for the respective colors calculate the signal levels of the supplied signals R, G and B. As the signal levels are calculated the DC values, DC_G, DC_B and DC_R. In other words, the DC values in the small regions of the signals R, G and B are calculated as the DC values, DC_G, DC_B and DC_R as shown in FIG. 11. The level calculators 101, 102 and 103 for the respective colors supply the calculated DC values, DC_G, DC_B and DC_R to the adjustment value setter 110.

The element setter 115 of the adjustment value setter 110 executes the following processing. In the case of the video signal obtained by the solid imaging device of the three-plate type in which the spatial pixel shifting method is adopted, the phase of the signal G is often different to the phases of the other signals (R and B) by 180 degrees. Therefore, the element setter 115 in the solid imaging device of the three-plate type thus characterized selects the DC value DC_G of the signal G, in advance, as a main adjustment DC value used when the first and the second adjustment values are set. Then, the element setter 115 selects a sub adjustment DC value used when the adjustment value is set from the DC values DC_R and DC_B of the other signals whose phases are shifted by 180 degrees relative to that of the signal G. The DC value in which noise is smaller, for example, is selected as the sub adjustment DD value. Further, the element setter 115 compares the level of the sub adjustment DC value (DC value DC_R in this case) and the level of the main adjustment DC value (DC value DC_G in this case), and sets the DC value whose level is larger as a large-level DC value Large, and sets the DC value whose level is smaller as a small-level DC value Small.

After the selecting and setting process, the element setter 115 supplies the large-level DC value Large, the small-level DC value Small and a variable Sel to the common signal adjustment value calculator 116, and supplies the large-level DC value Large and the small-level DC value Small to the adjustment value per color calculator 117. At the time, the element setter 115 provides, as a source of the sub adjustment DC value, a flag showing the selected signal (signal R in this case) and a flag showing the signal as the large-level DC value Large (signal G in this case) in the variable Sel to be outputted. When the image of the subject 501 including a large green region and having a high chroma (see FIG. 5) is obtained, the large-level DC value Large is used as the main adjustment DC value (=DC value DC_G), while the small-level DC value Small is used as the sub adjustment DC value (=DC value DC_R). Therefore, the flag showing the selection of the signal R as the source of the sub adjustment DC value and the flag showing the selection of the G signal as the source of the large-level DC value Large are provided in the variable Sel.

The common signal adjustment value calculator 116 calculates the first adjustment value GainX1 of the signals R, G and B. The first adjustment value GainX1 is an adjustment value used for the signal level adjustment in the calculation of the signals similar to those in the case of a low chroma when the common signal Y is calculated by the common signal calculator 125. The signal levels of the signals R, G and B are adjusted to be close to the achromatic color (balanced state in each signal) by the first adjustment value GainX1 thus set. The first adjustment value GainX1 is set based on a local similarity in amplitude shapes of the pre-sampling signals R, G and B. More specifically, the first adjustment value GainX1 is set, for example, as follows.

The common signal adjustment value calculator 116 reads the flags in the variable Sel supplied from the element setter 115 and thereby confirms the signals which are the sources of the main adjustment DC value, sub adjustment DC value, large-level CD value Large and small-level CD value Small. Then, the common signal adjustment value calculator 116 sets the first adjustment value GainX1 of the signal which is the large-level DC value Large to "1", and sets the first adjustment value GainX1 of the DC value of the signal which is the small-level DC value Small to Large/Small. Further, the common signal adjustment value calculator 116 sets the first adjustment value GainX1 of the DC value of the signal which is neither used for the large-level DC value Large nor the small-level DD value Small to "0". When the image of the subject 501 including a large green region and having a high chroma is obtained, the first adjustment value GainG1 of the signal G showing the main adjustment DC value is set to "1", the first adjustment value GainR1 of the signal R showing the sub adjustment DC value is set to Large/Small, and the first adjustment value GainB1 of the remaining signal B is set to "0". The common signal adjustment value calculator 116 supplies the calculated first adjustment value GainX1 to the common high frequency component calculator 120.

The first adjustment value GainX1 and the signals G, B and R are supplied to the common signal calculator 125 of the common high frequency component calculator 120. Using these supplied values and signals, the common signal calculator 125 calculates the common signal Y used as a common value (reference value) of the respective color signals. When the image of the subject 501 including a large green region and having a high chroma (see FIG. 5) is obtained, the amplitudes of the pre-sampling signal G (source of the large-level CD value Large) and signal R (source of the small-level CD value Small) are locally similar to each other, and the amplitude of the signal R is smaller than that of the signal G in the small regions.

Figure 12:
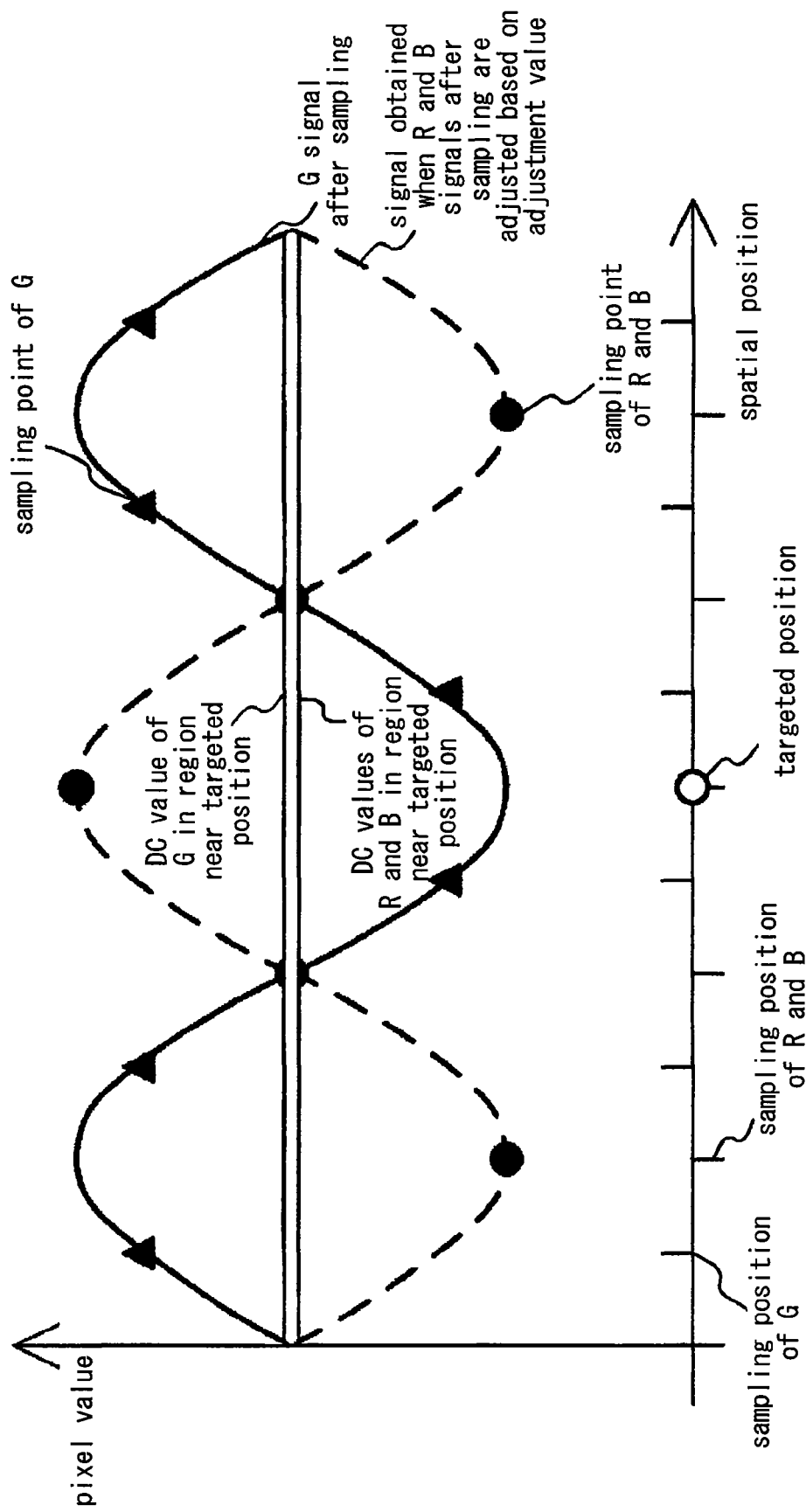
FIG. 12 shows signal waveforms and sampling positions in the signal processing circuit according to the preferred embodiment.

Therefore, the R signal is multiplied by the first adjustment value GainR1 (="Large/Small"), the G signal is multiplied by the first adjustment value GainG1 (="1"), and the B signal is multiplied by the first adjustment value GainB1 (="0") as shown in FIG. 12, so that the common signal Y having the same state as in the case of the low chroma in which the folding component is cancelled is generated. As described earlier, the spatial position for extracting the high frequency components of the signals R, G and B is called the targeted position, and the spatial region including the targeted position and the neighborhood thereof is called the small region. The common signal calculator 125 supplies the generated common signal Y to the common high frequency component separator 126. The common high frequency component separator 126 extracts the high frequency component of the common signal Y, that is the common high frequency component HY, using a filter or the like.

The DC values DC_G, DC_B and DC_R are supplied to the adjustment value per color calculator 17 of the adjustment value 110 from the level calculators 101, 102 and 103 for the respective colors. Further, the large-level CD value Large and the small-level CD value Small are supplied to the adjustment value per color calculator 117 from the level calculators 101, 102 and 103 for the respective colors from the element setter 115. The adjustment value per color calculator 117 sets the second adjustment value GainX2 from these supplied values.

The second adjustment value GainX2 is an adjustment value which exerts an action contrary to that of the first adjustment value GainX1, and is set in order to generate the adjusted high frequency components HG, HB and HR. More specifically, the second adjustment value GainX2 returns a ratio of the high frequency component of the signal whose level is increased based on the first adjustment value GainX1 to a ratio corresponding to an original color balance of the relevant color (balances of the respective color components) again.

More specifically, when the image of the subject 501 including a large green region and having a high chroma is obtained, the adjustment value per color calculator 117 calculates the second adjustment value GainX2 based on the following calculation formulas.

$$\text{Gain}G2=(DC\_G/\text{Large})=1$$

$$\text{Gain}B2=(DC\_B/\text{Large})$$

$$\text{Gain}R2=(DC\_R/\text{large})=(\text{Small/Large})$$

When the common high frequency component HY is generated, the common high frequency component calculator 120 uses the signal R in place of the signal B (first adjustment value GainB1="0"). However, in the calculation of the second adjustment value GainX2, the adjustment value per color calculator 117 calculates the second adjustment value GainB2 in a manner similar to the second adjustment value GainR2 based on the assumption that the common high frequency component in which the signal level of the first adjustment value GainB1 is increased so that the folding component is cancelled is similarly generated in the signal B.

The common high frequency component separator 126 of the common high frequency component calculator 120 supplies the extracted common high frequency component HY to the high frequency component adjusters 131, 132 and 133 for the respective colors. The adjustment value per color calculator 117 of the adjustment value setter 110 supplies the set second adjustment value GainX2 to the high frequency component adjusters 131, 132 and 133 for the respective colors.

The high frequency component adjusters 131, 132 and 133 for the respective colors multiply the supplied common high frequency component HY by the second adjustment value GainX2 to thereby calculate the adjusted high frequency components HG, HB and HR. Even when the image of the subject 501 including a large green region and having a high chroma is obtained, the common high frequency component HY is multiplied by the second adjustment value GainX2 of each color; whereby the adjusted high frequency components HG, HB and HR for the respective colors in which the original color balances are retained can be obtained. The high frequency component adjusters 131, 132 and 133 for the respective colors supply the calculated adjusted high frequency components HG, HB and HR to the high frequency component adders 301, 302 and 303 for the respective colors of the high frequency component adder 300 corresponding to the relevant colors. The high frequency component adders 301, 302 and 303 for the respective colors add the supplied adjusted high frequency components HG, HB and HR to the low frequency components LG, LB and LR, and thereby generate the output signals outG, outB and outR and output them outside of the signal processing circuit.

As so far described, the following processing is executed in the signal processing circuit according to the present preferred embodiment:

the common signal Y in which the folding component is cancelled is generated by means of the respective color signals adjusted based on the first adjustment value GainX1;

the common high frequency component HY of the generated common signal Y is adjusted to have the original color balance based on the second adjustment value GainX2; and the high frequency components HG, HB and HR obtained as a result of the foregoing adjustment are added to the low frequency components LG, LB and LR of the respective signals G, B and R.

Accordingly, the signal processing circuit according to the present preferred embodiment can obtain the signal in which the folding component is controlled and the high frequency component does not turn to the achromatic color while maintaining a high resolution even when the image of the subject

Figure 13:
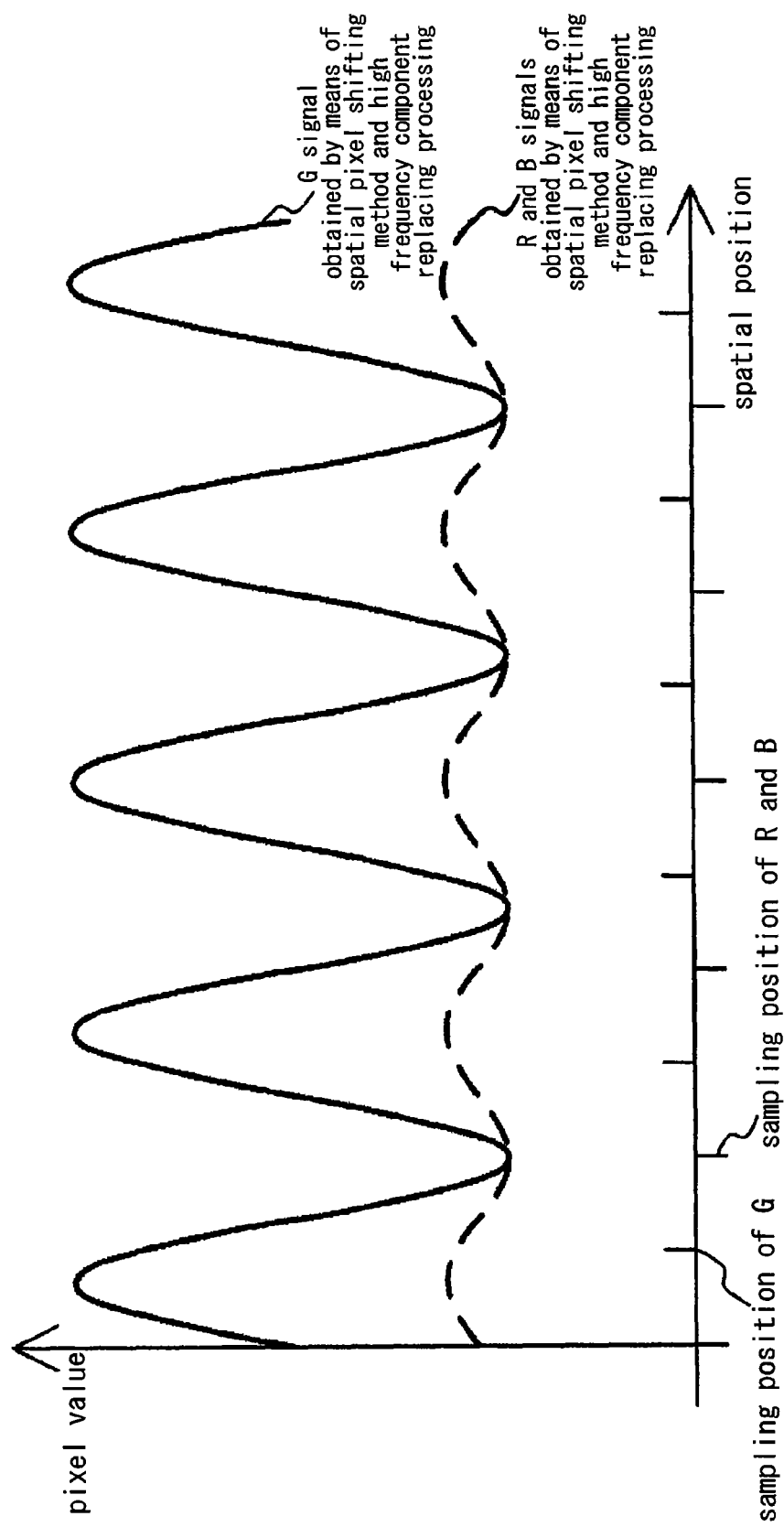
FIG. 13 shows signal waveforms in the signal processing circuit according to the preferred embodiment.

501 including a large green region and having a high chroma is obtained as shown in FIG. 13.

Further, the signal processing circuit according to the present preferred embodiment can, without any problem, process signals obtained when a subject 401 shown in FIG. 4 having a stripe pattern of black and white colors including the high frequency component having a frequency equal to or more than the Nyquist frequency and having a low chroma is shot. The Nyquist frequency in this description denotes the Nyquist frequency in the case where the CCDs are not shifted as described earlier.

Figure 6:
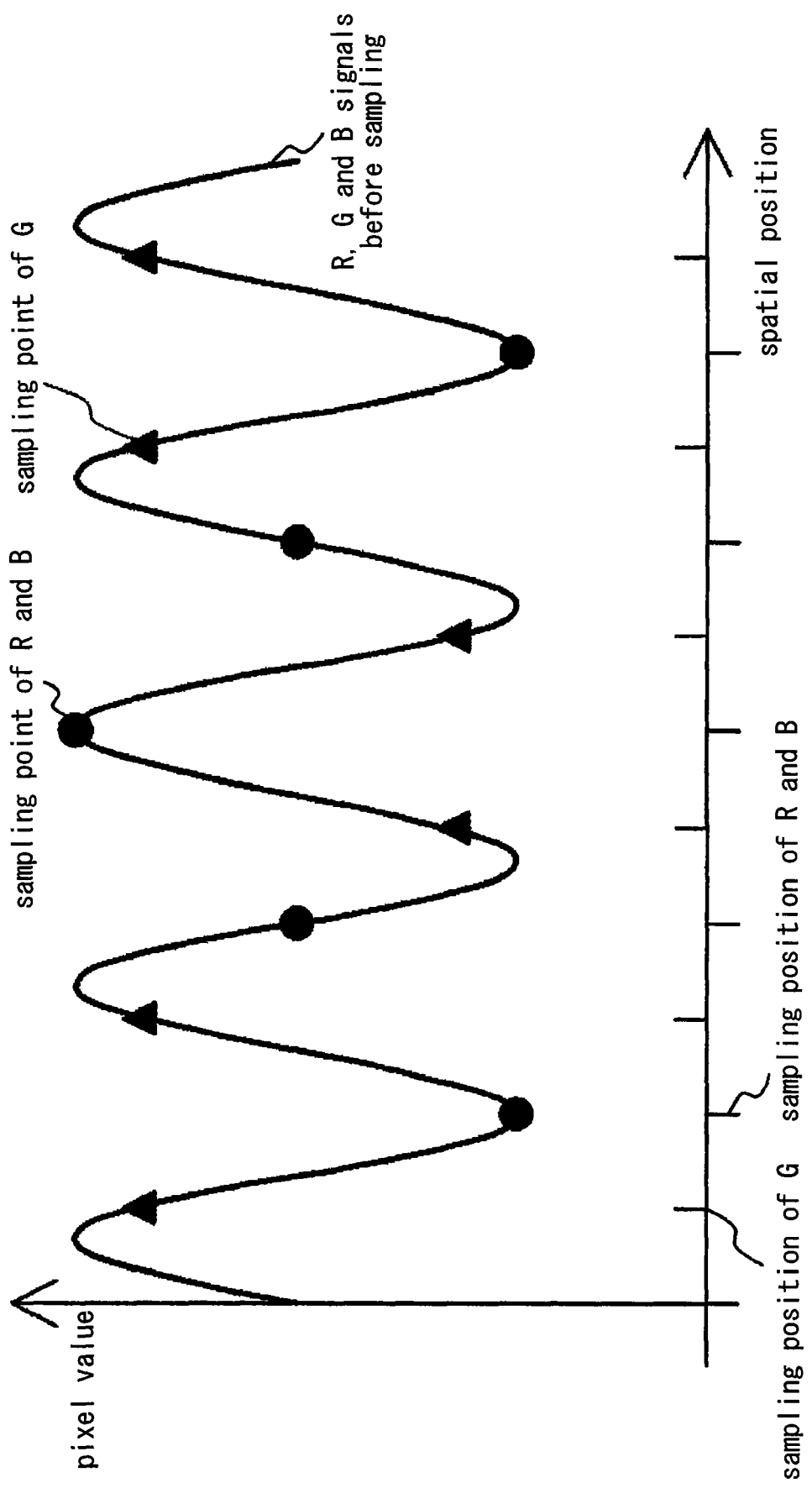
FIG. 6 shows signal waveforms and sampling positions in the signal processing circuit according to the preferred embodiment.
Figure 7:
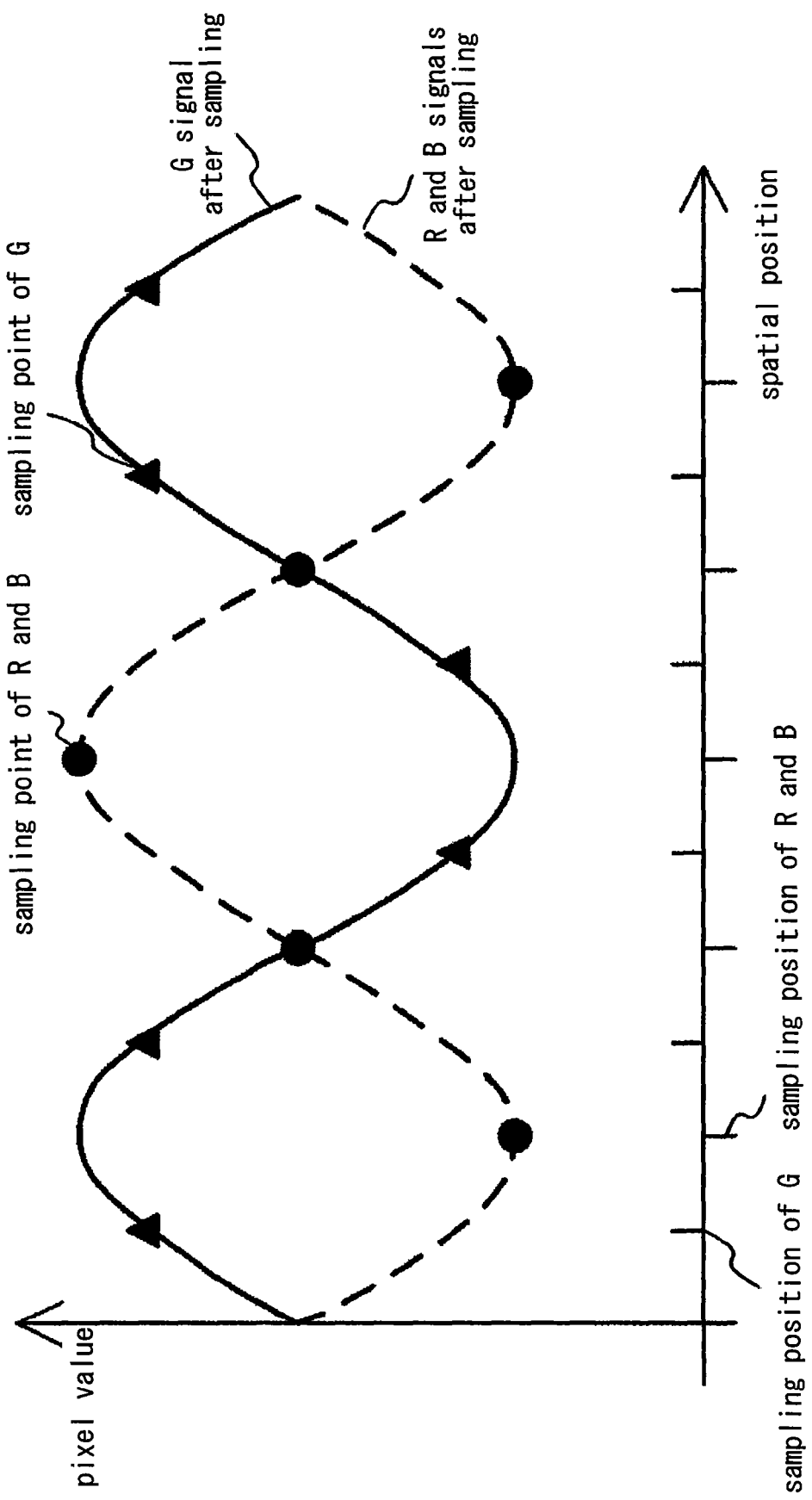
FIG. 7 shows signal waveforms and sampling positions in the signal processing circuit according to the preferred embodiment.

The signals obtained when the subject 401 shown in FIG. 4 is imaged are also expressed as shown in FIG. 6 in a manner similar to the signals described earlier. The post-sampling signals G, R and B thus obtained each include counterfeit signals of the folding components as shown in FIG. 7. However, the counterfeit signals are removed in the same way as described earlier in the operation according to the present preferred embodiment. Below is given a description.

The description of the operation, which is similar to that of the earlier description, is omitted, and the respective values obtained by the operation are described. The DC values DC_G, DC_B and DC_R in the small regions are substantially the same. Therefore, assuming that Large=DC_G, and Small=DC_R, the first adjustment value GainX1 used for the generation of the common signal Y is as follows.

$GainG1=1$ $GainB1=0$ $GainR1=(Large/Small)=1$

The common signal Y thereby obtained is substantially equal to the common signal Y obtained according to the conventional method.

Further, the second adjustment value GainX2 for adjusting the common high frequency component HY obtained from the common signal Y for the respective colors is as follows:

$GainG2=(DC\_G/Large)=1$ $GainB2=(DC\_B/Large)=1$ $GainR2=(DC\_R/Large)=1$

The high frequency component thereby obtained is substantially equal to the high frequency component obtained according to the conventional method.

Figure 8:
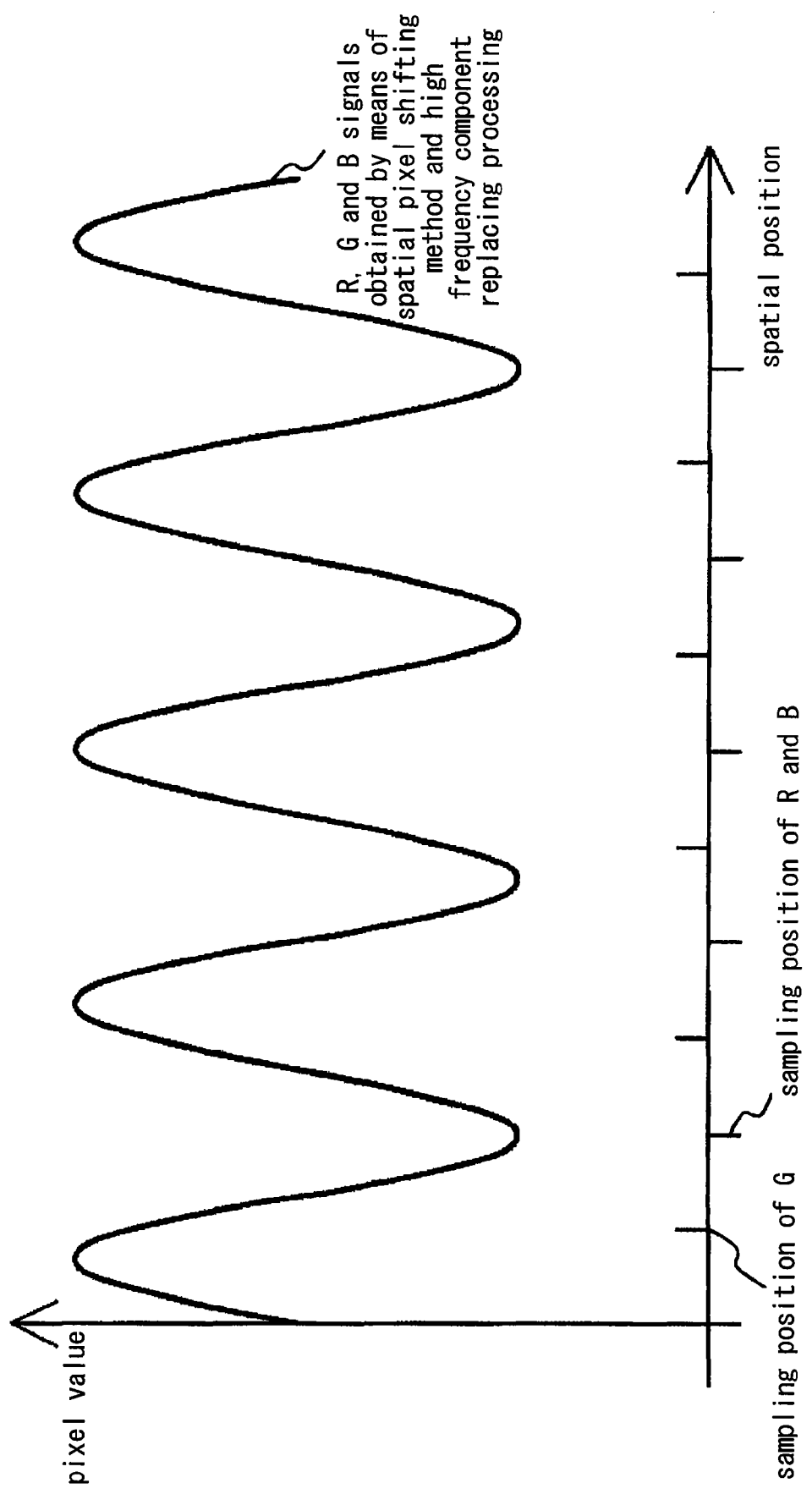
FIG. 8 shows signal waveforms in the signal processing circuit according to the preferred embodiment.

Therefore, as shown in FIG. 8, when the subject 401 having a low chroma is imaged, the common signal Y in which the folding component is cancelled is generated by means of the conventional color signals, and the adjusted high frequency components HG, HB and HR of the common signal Y are added according to the conventional method. As a result, the signal with a high resolution in which the folding component is controlled can be obtained. More specifically, the signal with a high resolution can be provided without any problem in such a manner that effect of the high frequency component replacing processing in which the conventional spatial pixel shifting method is used is maintained.

In the description of the present preferred embodiment, the example of the solid imaging element is CCD. However, an imaging element other than the CCD, such as CMOS, may be used. Further, in the description, the signals obtained by the solid imaging element are R, G and B; however, may be signals of complementary colors such as C (cyan), M (magenta) and Y (yellow). The example of the solid imaging element in the description is the solid imaging element of the three-plate type; however, the solid imaging element may have a Bayer array comprising one plate, two plates or four or more plates as long as a similar effect can be obtained. The direction in which the solid imaging element is shifted is horizontal in the description; however, the shift may be in the vertical direction, or in both horizontal and vertical directions. The solid imaging element is shifted by one-half of a pixel in the description. However, the order of the colors in the Bayer array may be rearranged or at least two plates may be used, and then the solid imaging element is shifted by 1/n (n is an integral number) of a pixel in order to cancel the folding component, wherein a similar effect can still obtained.

In the element setter 115 shown in FIG. 3, the signal R is used as an example of a signal whose phase is shifted by 180 degrees relative to that of the signal G. However, the signal B or a mixed signal in which the signals R and B are combined, for example, may be used. Further, these signals may be both used in such a manner that they are switched to each other on an as needed basis.

In the common signal adjustment value calculator 116 shown in FIG. 3, referring to the first adjustment value GainX1 in the case where the subject 501 having a high chroma is shot, the signal level which shows a large value in the comparison is used as a reference value (common value) as in, $GainG1=1$ $GainB1=0$ $GainR1=(Large/Small)=1$ Then, the signal which shows a small value in the comparison is made to comply with the large-value signal (reference value).

However, the signal level of the large-value signal may be made to comply with the signal level of the small-value signal (reference value) after the signal level of the small-value signal is set as the reference value. Further, the signal level as the reference value may be calculated based on the large-value signal and the small-value signal so that the signal levels of both signals are made to comply with the calculated reference value. As a method of calculating the reference value, an intermediate level or an average value of both signals is calculated as the reference value. In the case where the average value is calculated as the reference value, the respective signals may be weighted.

In the example shown in FIG. 11, the small region is set as a region covering five-six sampling positions; however, may have more or fewer sampling positions. Further, the horizontal regions do not necessarily constitute the small region, and vertical regions or regions in both directions may constitute the small region. A shape of the small region is not limited.

In the case where the used signals are possibly unreliable due to noise or the like, such an adjustment that the level of the unreliable signal is set to be relatively low can be made in the level calculators 101, 102 and 103 for the respective colors.

In the case where the used signals are possibly unreliable due to noise or the like, the respective adjustment values may be adjusted in the adjustment value setter 110. For example, the first adjustment value GainX1 and the second adjustment value GainX2 may be adjusted so that the influences of the first adjustment value GainX1 and the second adjustment value GainX2 on the generation of the common signal Y and the adjusted high frequency components HG, HB and HR are reduced.

In the case where the used signals are subjected to a preprocessing such as a filtering process using a low-pass filter, a band-pass filter or the like, the filtered signals may be used for the inputs of the level calculators 101, 102 and 103 for the respective colors in order to efficiently utilize the signals. In the case where the used signals are subjected to a post-processing such as the filtering process using the low-pass filter, band-pass filter or the like, the filtered signals may be used for the inputs of the level calculators 101, 102 and 103 for the respective colors in order to efficiently utilize the signals, or the filtered signals may be used as the outputs thereof.

The low frequency component separators 201, 202 and 203 for the respective colors are separately used for the different colors; however, a common operation device may be used, which is also applied to the level calculators 101, 102 and 103, high frequency component adjusters 131, 132 and 133 and high frequency component adders 301, 302 and 303.

The signal processing circuit shows a part of circuits of an imaging device such as a video camera. Therefore, the processing generally executed in the video camera or the like is not described. The signals G, B and R to be inputted may be the pre-processed signals G, B and R. As an example of the pre-processing, data of a previous signal may be used as data corresponding to a spatial position not subjected to the sampling in a pre-hold manner, or another interpolating processing such as a filtering process may be used. The processing may be a digital processing or an analog processing.

The operating devices shown in FIGS. 1-3 are schematically shown so that the operations thereof can be easily understood. As long as it can find out a operation and signal applicable to the present invention, the operation and signal which were found out may be applied to the present invention.

In the preferred embodiment described above, the present invention is implemented in the signal processing circuit for processing the video signal; however, may be similarly implemented in a signal processing circuit for processing an audio signal. Therefore, the present invention is applicable to audio capture by the video camera, an audio decoder and the like.

When processing in which sampling and thinning phases are shifted and the phase-shifted audio signals are synthesized (processing equivalent to the spatial pixel shifting method) is executed to a stereo audio signal including a right-ear audio signal and a left-ear audio signal, apparent sampling intervals and thinning intervals can be narrowed. In that case, when a high frequency component including folding components of both the audio signals is replaced with a common high frequency component common to the respective signals in which the folding component is reduced, the folding component can be controlled. However, in the case where the signal level of one of the audio signals is significantly smaller than that of the other audio signal, it is not possible to cancel the folding component of the high frequency component in the audio signal whose signal level is larger using the audio signal whose signal level is smaller, as a result of which the common high frequency component still includes the folding component. As a result, such an inconvenience as groaning sound resulting from the folding component is generated in the synthesized audio signal. In the case where the signal processing circuit recited in the Patent Document 1 is applied to the audio signal, the groaning sound can be more or less controlled; however, an audio signal lacking more of a balance between the signal levels results in an audio signal in which less of the high frequency component is included. As the balance between the signal levels is more lost, the resolution in the high frequency component has to be more sacrificed, which results in the deterioration of the audio localization accuracy. In the case where the present invention is implemented for the audio signal in which such an inconvenience inevitably occurs, the groaning sound can be controlled without the sacrifice of the resolution in the high frequency component. In the case where the present invention is implemented for a 2ch audio signal, the low frequency component separator 200, level detectors 102-103, high frequency component adjusters 131-133, and high frequency component adder 300 are preferably each prepared in a pair for the right-ear and left-ear audio signals. The present invention can be similarly implemented for a multi-channel audio signal such as 5.1 ch other than the 2ch audio signal.

INDUSTRIAL APPLICABILITY

In the signal processing method for executing the high frequency component replacing processing in which the spatial pixel shifting method is adopted according to the present invention, the signal with a high resolution in which the moire effect is controlled and the high frequency component's turning to an achromatic color is controlled even in the case of the subject having a high chroma can be provided. Further, in the subject having a low chroma, the signal with a high resolution can be provided without any problem in such a manner that the effect of the high frequency component replacing processing in which the conventional spatial pixel shifting method is used is maintained. Further, the present invention relates to such a simple signal processing method that makes it unnecessary to select an appropriate processing in a complicated manner depending on image characteristics and the like. Therefore, the signal processing circuit capable of exerting a satisfactory effect though simply constituted can be provided according to the present invention. The signal processing method is advantageously used for a still camera, a video camera and the like.

In an image compression encoding process in which pixels are thinned, the signal processing method according to the present invention is also applicable when signals, in which the phases of the thinned pixels are shifted, are compressed, encoded and then decoded. Therefore, the present invention is advantageously used for a video decoder and the like.

Further, the present invention can be applied to an audio signal, and is effectively applicable to audio capture by the video camera, an audio decoder and the like.

What is claimed is:

1. A signal processing method for processing at least two signals having phases different to each other obtained by means of spatial pixel shifting method, including:
   a low frequency component separating step for separating low frequency components of the respective signals;
   a common high frequency component calculating step for adjusting signal levels of the signals to a well-balanced state in the respective signals and then separating a common high frequency component from the adjusted signals;
   a high frequency component adjusting step for generating an adjusted high frequency component in accordance with each of the signals by adjusting a signal level of the common high frequency component to the original signal levels of the respective signals; and
   a high frequency component adding step for adding the adjusted high frequency components adjusted in the high frequency component adjusting step to the low frequency components separated in the low frequency component separating step.

2. A signal processing device for processing at least two signals having phases different to each other obtained by means of spatial pixel shifting method, comprising:
   a low frequency component separating device for separating low frequency components of the respective signals;

a common high frequency component calculating device for adjusting signal levels of the signals to a well-balanced state in the respective signals and then separating a common high frequency component from the adjusted signals;

a high frequency component adjusting device for generating an adjusted high frequency component in accordance with each of the signals by adjusting a signal level of the common high frequency component to the original signal levels of the respective signals; and a high frequency component adding device for adding the adjusted high frequency components adjusted by the high frequency component adjusting device to the low frequency components separated by the low frequency component separating device.

3. The signal processing device as claimed in claim 2, further comprising:

a low frequency component separating device for separating low frequency components of the respective signals;

a first adjustment value setting device for setting, for each of the signals, a first adjustment value for adjusting the signal levels of the respective signals to the well-balanced state in the respective signals; and a second adjustment value setting device for setting, for each of the signals, a second adjustment value for adjusting the signal levels of the respective signals adjusted to the well-balanced state by the first adjustment value to the original signal levels, wherein the common high frequency component calculating device adjusts the signal levels of the respective signals to the well-balanced state in the respective signals based on the first adjustment value, and the high frequency component adjusting device adjusts a signal level of the common high frequency component to the original signal levels of the respective signals based on the second adjustment value.

4. The signal processing device as claimed in claim 3, wherein the high frequency component calculating device comprises:

a common signal calculating device for calculating a common signal having a common value of the respective signals adjusted to the well-balanced state in the respective signals by the first adjustment value; and a common high frequency component separating device for separating the common high frequency component from the common signal.

5. The signal processing device as claimed in claim 3, further comprising an element setting device for setting a signal level of a first signal which is one of the signals and a signal level of a second signal which is the other of the signals, wherein the first adjustment value setting device sets the first adjustment value based on the signal levels of the first and second signals, and the second adjustment value setting device sets the second adjustment value based on the signal levels of the first and second signals.

6. The signal processing device as claimed in claim 5, wherein the element setting device sets signal levels in a spatial region including a spatial position for extracting the first and second signals and the neighborhood thereof as the signal levels of the first and second signals.

7. The signal processing device as claimed in claim 6, wherein the element setting device sets an average value of the signal levels in the spatial region as the signal levels of the first and second signals.

8. The signal processing device as claimed in claim 6, wherein the element setting device sets a weighted average value of the signal levels in the spatial region as the signal levels of the first and second signals.

9. The signal processing device as claimed in claim 3, wherein the first adjustment value setting device sets a reference value of the signal levels of the first and second signals based on the signal levels of the first and second signals, and then sets an adjustment value by which the signal levels of the first and second signals are caused to be consistent with the reference value as the first adjustment value.

10. The signal processing device as claimed in claim 5, wherein the element setting device sets the signal levels of the first and second signals based on low frequency components thereof.

11. The signal processing device as claimed in claim 5, wherein the element setting device sets the signal levels of the first and second signals based on arbitrary band components thereof.

12. The signal processing device as claimed in claim 5, wherein the element setting device removes noise from the first and second signals, and sets the signal levels of the first and second signals based on the first and second signals from which the noise is removed.

13. The signal processing device as claimed in claim 5, wherein the element setting device adjusts the signal levels of the first and second signals so that an influence of the signals including the noise on the first and second adjustment values is lessened as a signal reliability is lower based on the noise included in the signals.

14. The signal processing device as claimed in claim 9, wherein the first adjustment value setting device sets the first adjustment value based on calculation formula of, first adjustment value=(reference value/signal level of each signal).

15. The signal processing device as claimed in claim 14, wherein the second adjustment value setting device sets the second adjustment value based on calculation formula of, second adjustment value=(signal level of each signal/reference value).

16. The signal processing device as claimed in claim 3, wherein the first and second adjustment value setting devices adjust the first and second adjustment values so that an influence of the signals including noise on the first and second adjustment values is lessened as a signal reliability is lower based on the noise included in the signals.

17. The signal processing device as claimed in claim 5, wherein phases of the first and second signals are different to each other by 180 degrees.

18. The signal processing device as claimed in claim 5, wherein
the first signal is a first group of signals including one or more signals having phases equal to each other, and
the second signal is a second group of signals including one or more signals having phases equal to each other.

19. The signal processing device as claimed in claim 18, wherein
the first adjustment value setting device sets the first adjustment value from each of the signals constituting the first group of signals, and
the second adjustment value setting device sets the second adjustment value from each of the signals constituting the second group of signals.

20. The signal processing device as claimed in claim 18, wherein
the first and second signals are image signals, and
the first group of signals are green signals, and the second group of signals are red and blue signals.

* * * * *